Figure 1:
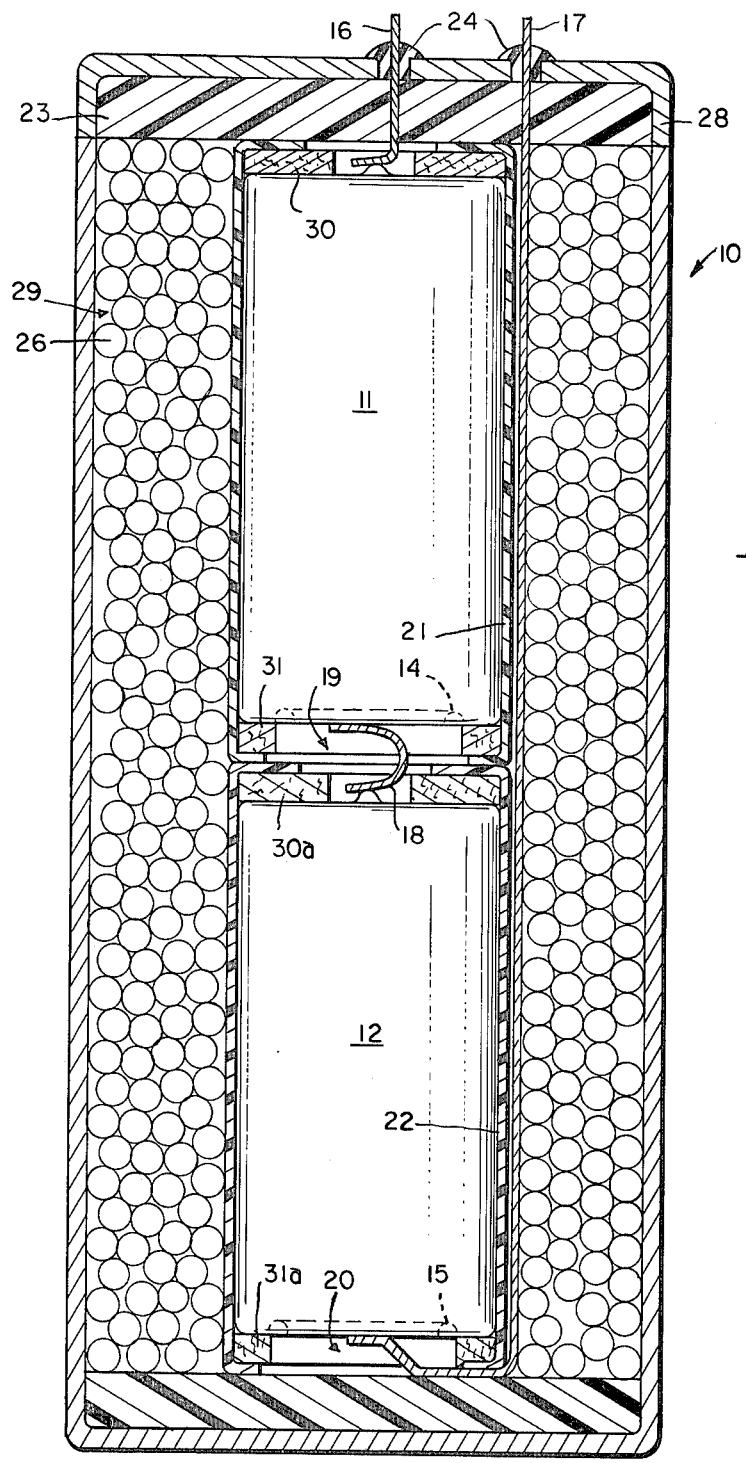

United States Patent [19]

Ciliberti, Jr.

[11] 4,053,691
[45] Oct. 11, 1977

[54] POROUS LIGHT WEIGHT BATTERY FILLER

[75] Inventor: Frank L. Ciliberti, Jr., Ossining, N.Y.

[73] Assignee: P. R. Mallory & Co., Inc., Indianapolis, Ind.

[21] Appl. No.: 728,671

[22] Filed: Oct. 1, 1976

[51] Int. Cl.² .......................................... H01M 2/00
[52] U.S. Cl. .................................................. 429/163
[58] Field of Search ......................... 429/163, 96–100, 429/120

[56] References Cited

U.S. PATENT DOCUMENTS 3,451,850 6/1969 DuPlessix ........................ 429/120 X

*Primary Examiner*—C. F. LeFevour
*Attorney, Agent, or Firm*—Ronald S. Cornell; Israel Nissenbaum; Charles W. Hoffmann

[57] ABSTRACT

A method for encasing electrochemical cells in a porous structure of pellets adhered to one another enabling individual cell venting, and a battery utilizing the porous structure.

5 Claims, 3 Drawing Figures

POROUS LIGHT WEIGHT BATTERY FILLER

This invention relates to the encasement of objects in containers and more particularly to encasing one or more cells in a container to form a battery which is capable of withstanding impact stress without rendering the battery useless due to loose connections or the like.

Various materials have been utilized in the past to prevent shifting of cells contained within outer containers and as protection against shock and vibration. These materials which are usually referred to as fillers or potting compounds generally have fallen in the categories of tar substances such as asphalt, epoxy resin compounds, waxes, heat shrink plastics or simply cardboard members. The function of these materials has been to prevent cells from moving in relation to each other and in relation to the container. Cell breakage, with resultant loss of cell contents and reduced capacity, and especially intercell connector dislocation are averted by such encasement. An additional feature of the filler materials which have been used is either the prevention of cell leakage or the absorption of leaked material.

With the advent of truly hermetic cells, each having its own individual venting means, the desirable features of most of the above mentioned encapsulating materials become detrimental. Thus, a cell having its own vent for relief of excessive internal pressure which is encapsulated in a solid material cannot expand and therefore is prevented from venting and even if it vented could not pass gas through the solid material. These drawbacks can have explosive consequences. On the other hand, soft fillers such as cardboard require expensive cutting and shaping or large inventories for different size and shape containers and do not prevent relative movement between cells if exposed to sudden, high impact forces.

It is therefore an object of the present invention to provide a method by which a cell or several cells can be rigidly encased in an outer container while still maintaining the ability of the cell or cells to individually vent.

It is a further object of the present invention to provide a battery with a rigidly structured filler material which is inexpensive, easily and universally usable, lightweight, and sufficiently porous to permit individual cell venting and which can be constructed at ambient temperatures.

Figure 2:
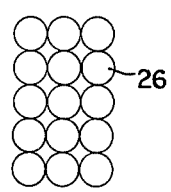
Figure 3:
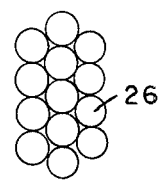

These and other objects and advantages will become apparent from a further discussion as well as from the drawings in which:

FIG. 1 is a vertical sectional view of a battery having several cells encased therein; and FIGS. 2 and 3 show different ways in which an encasing material can theoretically be arranged.

The present invention envisions the positioning of a cell or several cells with proper terminal arrangement within a container. Thereafter, the cell or cells are immovably fixed into position by filling the void space within the container, which surrounds the cell or cells, with pellets of sufficient size so that when they are adhered to each other there will be a porous structure formed which will not hinder, to any great extent, the venting of the cell or cells. The pellets are preferably adhered to each other either by a solvent molding process or by pretreating the particles with sufficient adhesive to coat the pellets.

Though the invention has been described as being applicable for cells requiring venting it is equally applicable to the encapsulation of other objects, for examples cells which do not require venting and which do not have leaking problems or which have other means for taking care of any possible leakage. The materials contemplated by the present invention have the advantages of low cost, light weight, ambient temperature construction and general ease of fabrication.

The pellets should have a lower size limit sufficient to form a porous structure having at least 20% porosity. Such structure will provide adequate venting open area for passage of gas therethrough. For nonventing cells, the primary criteria would be the degree of lightness required and the cost of materials, with the larger pellets being preferred because of increased void space and concomitant reduced material, weight and cost. Though there is no fixed upper size limit, the useful size of the pellets generally can be determined from various factors such as amount and configuration of the void volume around the cell or cells. A larger void volume would permit the use of the larger pellets which are preferred since a lighter, more porous structure could therefore be formed. If the vent in the individual cell requires a degree of motion latitude to operate between the cells the pellet size should be sufficient to exclude such particles from this particular area.

The pellet materials which are preferred are those which can easily be formed by suspension polymerization, as known in the plastic art, such as polystyrene, polymethyl methacrylate and polyvinyl chloride. Other plastics which can be formed into pellets such as nylon, polyethylene, polypropylene may also be useful. The pellet material need not even be a plastic as long as individual particles are nonfrangible, can be adhered to each other, and the structure formed therewith has an adequate degree of shock dampening and rigidity. The degree of rigidity desired can be determined according to ASTM test D695 as having a compressive strength in excess of about 2,000 psi. Thus pellets of clay, ceramics or even treated wood chips could be useful whereas hollow glass beads cannot be used since larger pellets would shatter and smaller pellets would not provide the required porous structure. Foamed polystyrene, which has commonly been used for general container packing, is likewise unusable because of its lack of strength and rigidity under shock conditions. Use of such weak materials could result in movement of cells held in place by such materials which could cause such ill effects as disconnection.

The preferred shape of the pellets is spherical because of their commercial availability, their low cost, their packing qualities and the fact that spherical beads when adhered together will, because of their geometrical configuration, leave adequate void space. Other shapes such as cubes, spaghetti-like strands, triangles and the like as well as mixtures of shapes can also be utilized. Again, a criterion for pellets of any configuration is that they are of sufficient size so that when they are adhered to each other the porosity of the structure formed is at least about 20%.

The most preferred method of adhesion is what will be referred to herein as "solvent molding" wherein a solvent is selected which will affect the material of the pellets in such a manner that the outer surface of each pellet is momentarily softened or dissolved when the solvent is passed, either in liquid or vaporized form, through a mass of discrete pellets. The softened outer surfaces in contact with each other harden after the solvent is removed thereby forming the desired integral porous structure. The formation of the integral structure is practically instantaneous and the amount of solvent utilized can be selected either to be more than sufficient to perform the solvent molding process (with the excess being removed) or the predetermined precise amount necessary can be added, with any slight excess rapidly evaporating since the solvents used generally have high vapor pressures. Examples of useful solvents are acetone, n-butyl-acetate, tetrahydrofuran, toluene, trichloroethylene, vinyl trichloride, cello-solve acetate, cyclohexanone, methyl alcohol and methyl chloroform, Table I which follows correlates a sampling of plastics which are useful with the abovementioned solvents.

Table I

| SOLVENTS | USEFUL PLASTICS |
|---|---|
| Acetone | Acrylic, Polystyrene (PS), Cellulose acetate, Acrylonitrile Butadiene Styrene (ABS), Nitrocellulose, Ethyl cellulose, Cellulose acetate butyrate, Alkyd, Epoxy, Vinyl chloride acetate, Vinyl acetate, Vinyl butyral |
| n-butyl acetate | PS, ABS, nitrocellulose, Ethyl cellulose, Acrylic, Alkyd, Epoxy, Vinyl chloride acetate, Vinyl acetate, Vinyl butyral |
| Tetrahydrofuran (THF) | PS, Acrylic, Nitrocellulose, Ethyl cellulose, Cellulose acetate, Cellulose acetate butyrate, Alkyd, Epoxy, Vinyl chloride acetate, Vinyl acetate, Vinyl butyral |
| Toluene | PS, Polyphenylene oxide, Ethyl cellulose, Acrylic, Alkyd, Vinyl acetate |
| Trichloroethylene | PS, Acrylic, Polycarbonate, Polyphenylene oxide, ABS |
| Vinyl trichloride | PS, Acrylic, Cellulose acetate, Polycarbonate, Polyphenylene oxide, ABS |
| Cello-solve acetate | PS, Acrylic, Cellulose acetate, ABS |
| Cyclohexanone | PS, Polyvinyl chloride (PVC), Cellulose acetate, Polycarbonate, ABS |
| Methyl alcohol | Vinyl butyral, Ethyl cellulose, Nitrocellulose, Vinyl acetate |
| Methyl chloroform | PS, Polyphenylene oxide |

From the above Table it is readily evident that polystyrene is a preferred material because of its susceptibility to a wide range of solvents and it therefore can provide a greater flexibility in the implementation of the present invention.

In an alternate embodiment of the invention, used when the pellet material is resistant to solvents or when a solvent would deleteriously affect the particular container material, another adhesion method is used in which the pellets are premixed with a sufficient amount of an adhesive such as an expoxy resin to coat the pellets, and thereafter the void spaces around the cells are filled with the coated pellets. When the adhesive cures a rigid porous structure is formed. An excess of adhesive is to be avoided since any excess adhesive would adversely affect the porosity and weight of the packing material.

Desirably, a low viscosity adhesive will be utilized so that the pellets are coated with a thin layer of the adhesive, and any excess adhesive flows to the bottom of the structure where it can easily be removed or where it is sufficiently remote as not to affect venting of the encapsulated cells.

Materials such as nylon, polyethylene, polypropylene, phenolics and tetrafluoroethylene, diallylphthalate and nonplastic materials such as ceramics are substantially immune to the effects of most solvents and the coating of pellets formed of such materials is therefore the preferred method of adhesion. Though adhesives generally do not adhere to materials such as polytetrafluoroethylene they do however provide an adequate coating to provide the necessary adhesion between the pellets. By using an adhesive in the manner described, materials other than plastics can be utilized with the same constrictions regarding pellet size (providing a porosity of at least 20%) rigidity and shock resistance (ASTM tested material having a compressibility in excess of 2,000 psi).

Examples of adhesives for use with plastics or with other materials useful in the present invention can be found in Modern Plastics Encyclopedia at page 484 of the 1974-1975 Edition and which is here incorporated by reference. Some adhesives used in bonding plastic to plastic are enumerated in Table II below by way of example.

TABLE II

| Adhesive | Suitable Plastic or Plastics |
|---|---|
| ELASTOMERIC | |
| Neoprene | Nylon, Diallylphthalate, Epoxies, Melamine, Phenolics |
| Nitrile | Acetal, Cellulosics (cellulose acetate, cellulose acetate butyrate, and cellulose nitrate), polyvinyl chloride (PVC), Diallylphthalate, Epoxies, Melamine Phenolics, Polyester-fiberglass |
| Urethane | Cellulosics, Polymethyl-methacrylates, Polystyrene, PVC, Phenolics, Polyethylene terephthalate |
| Styrene butadiene | Polymethyl-methacrylate, Polystyrene |
| THERMOPLASTIC RESIN | |
| Polyvinyl acetate | PVC |
| Acrylic | Polymethyl-methacrylate, Polystyrene, PVC |
| Cellulose nitrate | Cellulosics, Ethyl cellulose |
| THERMOSETTING RESIN | |
| Resorcinol, phenolresorcinal | Nylon, Tetrafluoroethylene (with surface treatment) |
| Epoxy | Acetal, Nylon, Polyethylenes and Polypropylenes (with surface treatment), Polystyrene, Tetrafluoroethylene (with surface treatment), Diallyl phthalate, Epoxies, Melamine, Polyester-fiberglass |

TABLE II-continued

| Adhesive | Suitable Plastic or Plastics |
| --- | --- |
| Cyanoacrylate | Nylon, Polycarbonates, Polymethyl-methacrylate, Polystyrene, Phenolics |
| Phenolic-polyvinyl butyral | Polyethylenes and Polypropylenes (with surface treatment), Polystyrene, diallylphthalate, Epoxies, Melamine, Phenolics, Polyester-fiberglass |
| Polyester | Nylon, Polymethyl-methacrylate, Polystyrene, PVC, Diallyl phthalate, Epoxies, Melamine, Phenolics, Polyester-fiberglass, Polyethylene terephthalate |
| MISCELLANEOUS | |
| Rubber lactices (water based-natural or synthetic) | Polyethylenes and Polypropylenes (with surface treatment) |
| Resin emulsions (water based) | PVC |

EXAMPLE I

As shown in FIG. 1 two standard D size cells 11, 12 (each about two inches in height one inch in diameter, and 3.3 cu. in. volume) are connected in series by interconnecting tab 18 which is previously welded to the bottom (negative terminal) of cell 11 and to the closed fill port (positive terminal) of cell 12. An elongated tab 17 is welded to the bottom of cell 12 and drawn alongside the stacked cells to protrude above container 10 and serves as the negative terminal of the battery. Cells 11 and 12 are encircled by tubes 21,22 formed of heat shrinkable plastic material which provide insulation and hold cardboard washers 30,31 and 30a, 31a in place on the ends of cells 11 and 12 respectively. Cardboard washers 31 and 31a serve the function of providing space in which the end wall of the cell can move to permit cell venting through vents 14 and 15. Thus, washers 31 and 31a have a large inner diameter to accomodate the cell vents 14 and 15 and to allow the bottom end of the cells 11 and 12 to freely move in the spaces 19 and 20 defined by the washers. Cardboard washers 30 and 30a of cells 11 and 12 respectively serve to protect the closed fill ports cum positive terminals at the top of each cell by isolating said fill ports from direct contact with abutting cells or other surfaces. Cells 11 and 12 are concentrically placed in metallic container 10 having a diameter of about 2 inches, a height of about 5 inches, and a volume of about 16 cubic inches atop insulating disc 13. The void area around the cells is then filled with ⅛ inch diameter polystyrene beads. The annular volume between the cells and the container is about nine cubic inches and the void space remaining between the beads (i.e. porosity of the beads) is about 40%. Theoretically, a maximum porosity of about 47% can be obtained using spherical beads of substantially equal size. However, the porosity is dependent upon the manner in which the beads nest and the size of the beads. Straight columns of beads as shown in FIG. 2 will provide the greatest porosity assuming complete bead to bead contact and the configuration of FIG. 3 will provide the least porosity. The smaller the average size of the pellets or beads the greater will be the tendency for the beads to nest according to the configuration of FIG. 3 and porosity is accordingly reduced. The preferred minimum for bead size is about 1/32 of an inch diameter with non-spherical pellets having a slightly larger desirable size because of their increased tendency to nest.

About 60 ml of acetone is poured into the container 10 around cells 11 and 12 and over and through polystyrene beads 26. The acetone tends to dissolve the outer surface of the beads and causes them, upon drying, to fuse to each other thereby forming a rigid structure. The remaining acetone is decanted and an insulating disc 23 is placed atop the stacked cells 11 and 12 and above the rigid structure of beads 26. Terminals 16 and 17 are drawn through apertures in insulating disc 23 and through aligned apertures in the metallic container cover 28. Terminals 16 and 17 are insulatively isolated from metal cover 28 as well as fixed in position by the application of a small amount of vulcanized rubber around each terminal. If the cell or cells vent (at about 500 psi for a lithium/$SO_2$ cell system) the released gas is able to pass freely through the voids 29 around beads 26 and will blow out plugs 24 or similar means thereby safely venting the battery.

EXAMPLE II

A battery structure similar to that described in Example I is made using ⅛ inch diameter nylon beads in place of the polystyrene beads of Example I. Since nylon is relatively unaffected by acetone, as well as most other solvents, the beads are pretreated with an adhesive prior to emplacement of the beads around the cells. A low viscosity epoxy resin is mixed with a curing catalyst (Norcast 7633 Epoxy Resin with Norcure 133 Catalyst) in a ratio of 100:38 by volume. About 3.3 ounces of nylon beads are mixed with 4 ml of the above adhesive to thoroughly coat the beads. The mixture is then poured into container 10 around cells 11 and 12 and allowed to cure for about 2 hours at room temperature. If a quicker curing time is desired the temperature can be increased to provide the same results. The so coated beads form a rigid structure similar to the one attained by the use of a solvent in Example I. The rigid nylon bead structure formed has substantially the same mechanical properties as that of the polystyrene bead structure formed in Example I.

It will be obvious to one skilled in the art that a wide variety of plastic materials, solvents and/or adhesives can be utilized to effectuate the present invention in accordance with the criteria outlined above. Additionally the present encasement technique can be effectuated at room or slightly elevated temperatures with the resultant advantage that cells or other objects which are temperature sensitive can be encapsulated without harm whereas the currently used epoxy encapsulation method usually requires the use of high temperatures for free flow and proper encapsulation by the epoxy. Since the porous encasement of the present invention provides a structure which weighs less than half of that of a similar device which has been epoxy potted and which porous encasing material (especially polystyrene) costs about 1/5 of the current price of epoxy, the present invention is equally useful for encasement of any object subject to unusual stress or impact where non-rigid packing materials would not suffice.

What is claimed is:

1. A battery comprising an outer container, at least one electrochemical cell rigidly encapsulated within said container by a porous structure, said porous structure being comprised of a plurality of discrete pellets adhered to each other, said porous structure having a porosity of at least 20%.

2. The battery of claim 1 wherein said pellets are composed of a material having a compressive strength in excess of 2000 psi.

3. The battery of claim 1 wherein said pellets have a generally spherical configuration.

4. The battery of claim 1 wherein said pellets are comprised of polystyrene.

5. The battery as in claim 4 wherein said pellets have a diameter of about ⅛ of an inch.

* * * * *